United States Patent [19]
Bargelé et al.

[11] Patent Number: 5,545,083
[45] Date of Patent: Aug. 13, 1996

[54] APPARATUS FOR PROCESSING SLAUGHTERED POULTRY

[75] Inventors: Norbert Bargelé, Stockelsdorf; Manfred Brandt, Lübeck; Helmut Kunig, Bad Scwartau, all of Germany

[73] Assignee: Nordischer Maschinenbau Rud. Baader GmbH & Co., KG, Lubeck, Germany

[21] Appl. No.: 424,613

[22] Filed: Apr. 19, 1995

[30] Foreign Application Priority Data

Apr. 20, 1994 [DE] Germany .......................... 44 13 683.8

[51] Int. Cl.⁶ ..................................................... A22C 17/04
[52] U.S. Cl. ........................... 452/136; 452/165; 452/170
[58] Field of Search ..................... 452/135, 136, 452/170, 165

[56] References Cited

U.S. PATENT DOCUMENTS

| 4,688,297 | 8/1987 | Bartels ........................... 452/165 |
| 4,951,354 | 8/1990 | Callsen et al. ................... 452/136 |
| 5,098,337 | 3/1992 | Landt et al. ..................... 452/136 |
| 5,106,335 | 4/1992 | Behnk et al. .................... 452/162 |

FOREIGN PATENT DOCUMENTS 3811317  10/1989  Germany .

Primary Examiner—Willis Little
Attorney, Agent, or Firm—Fay, Sharpe, Beall, Fagan, Minnich & McKee

[57] ABSTRACT

An apparatus is described for processing the bodies of slaughtered poultry and thereby removing meat from the skeleton, specifically in the region of the clavicle (clavicula). The apparatus has a conveyor with saddles for carrying and conveying the poultry body with the breastbone directed upwards and the clavicle leading. In order to remove the meat from the branches of the clavicle, a block having groove-shaped recesses is inserted between the clavicle branches such that the branches slip into the recesses and lie flush with the flank surfaces. Scraping knives are then guided over the flank surfaces to separate the meat from the clavicle. In order to avoid the scraping knives from catching broken or stretched clavicles and thus push bone splinters into the meat, pressing elements are provided which operate directly upstream of the scraping knives and ensure that any broken bone pieces are pushed together with the rest of the clavicle branches into the recesses.

7 Claims, 1 Drawing Sheet

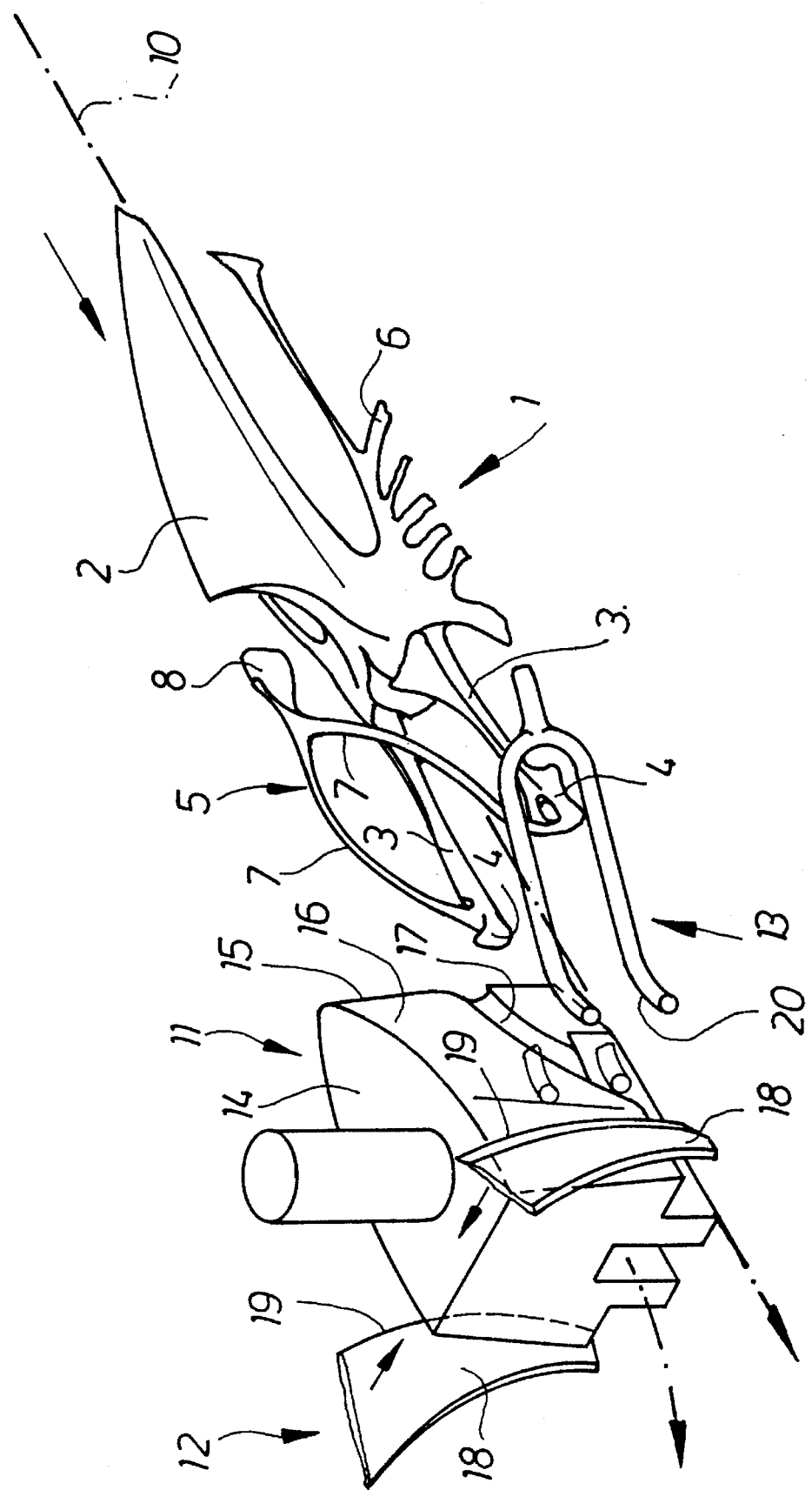

APPARATUS FOR PROCESSING SLAUGHTERED POULTRY

BACKGROUND OF THE INVENTION

1. Field of the Invention

The invention concerns an apparatus for processing bodies or body parts of slaughtered poultry poultry body comprising at least a breast portion having a clavicle or wishbone with left and right branches, said apparatus comprising elements for holding said poultry body aligned with respect to its plane of symmetry with left and right clavicle branches extending from either side of said plane, and for advancing said poultry body with the clavicle leading, a supporting element having flanks for inserting between the branches of the clavicle and supporting said branches at least from inside on said flanks, and scraping knives for removing meat from said clavicle, the scraping knives being controlled to move along said supporting element flanks.

2. Prior Art

An apparatus of this kind is known from DE-OS 38 11 317, for example. This document discloses an apparatus having a driven conveyor, which is equipped with carrying elements in the form of saddles for carrying and transporting the poultry to be processed with the neck opening of the poultry leading. In order to scrape free the clavicle, a block having a form adapted to the inner shape of the clavicle is controlled to be inserted between the two branches of the clavicle and so support the clavicle from inside. Scraping knives are then guided over the securely held clavicle to remove the meat.

However, as is mentioned in this document, in a considerable proportion of the processed poultry, the clavicle is broken or overstretched. Such damage can consist of several fractures, which results in free pieces of bone, which, although located in their natural position, are held in place solely by the surrounding soft tissue. The fact that fillets obtained using this apparatus contain a unacceptable amount of bone splinters from the clavicle, shows that with a product having clavicle fractured or deformed to this extent, it is not always possible to arrange the branches of the clavicle so that the clavicle may be completely scraped free.

This type of quality reduction is particularly serious, as bone splinters of this kind have as a rule quite uneven fracture surfaces which can cause serious injury to the mouth when the consumer unexpectedly bites on such a bone splinter. Such injuries regularly result in the consumer resorting to legal means to seek damages from the fillet producer. If such injuries are to be avoided the fillets have to be thoroughly inspected and maybe even trimmed, which requires extra personnel and leads to higher costs.

OBJECTS OF THE INVENTION

It is the primary object of the present invention to alleviate the aforementioned drawbacks.

It is a further object of the invention to modify the known apparatus to enable the production of fillets, which are splinter-free to a far greater extent than is conventionally possible.

SUMMARY OF THE INVENTION

These and further objects are achieved in an apparatus for processing whole or parts of slaughtered poultry comprising at least a breast portion having a clavicle with left and right branches, said apparatus comprising holding elements for holding said poultry body aligned with respect to its plane of symmetry with left and right clavicle branches extending from either side of said plane, and for advancing said poultry body with the clavicle leading, a supporting element having flanks for inserting between the branches of the clavicle and supporting said branches at least from inside on said flanks, and scraping means for removing meat from said clavicle, said scraping means being controlled to move along said supporting element flanks, wherein a pressing element is associated with said scraping means, said pressing element being arranged to operate directly upstream of said scraping means for pushing the clavicle branches against the flanks of the support element.

With an apparatus of this kind, it is possible to arrange even already fractured clavicle pieces or overly spread branches of clavicle around or withing the flanks of the supporting element such that the scraping knives can be guided along the supporting element flanks without the danger that the knives catch on the edges such fractures and force the bone pieces into the fillet meat or even create breaks themselves.

The poultry to be processed are expediently held by saddle-shaped carrying elements which are connected to a driven conveyor. In such an apparatus, particularly advantageous results can be attained by forming each pressing element as a pivot lever, of which the free end is able to pivot into the path of the advanced poultry and is biased in this position by spring force, and which is provided with a pressing face for contacting the poultry body or body portion essentially at the height of the advanced clavicle.

The supporting element is advantageously provided with recesses in each of its flanks, each recess been adapted to receive a branch of the clavicle such that the branch lies flush with the flank surface.

BRIEF DESCRIPTION OF THE DRAWINGS

Other and further objects of the present invention will be apparent from the following description and claims and are illustrated in the accompanying drawing which schematically shows a preferred embodiment of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims.

The FIGURE shows a schematic representation of a processing machine for scraping free the clavicle as part of a poultry filletting machine in perspective. In the FIGURE, only those parts essential for ensuring a clear understanding of the processing operation are shown, with their positions with respect to one another and to the poultry. The cooperating parts are shown in their positions shortly before the machine comes into operation, moreover, the poultry is represented by its skeleton to facilitate understanding of the function of the apparatus. Naturally, the skeleton of the actual poultry body or poultry piece being processed will be covered with meat and maybe even skin.

DESCRIPTION OF THE PREFERRED EMBODIMENT

An apparatus designed in accordance with the present invention and illustrated by the drawing is mounted in a non-shown frame of an machine for obtaining breast meat from either the bodies of slaughtered poultry, or, as in the presently illustrated case, from breast caps 1 of poultry. This apparatus comprises an endless conveyor 10, which is indicated in the FIGURE by a dash-dotted line and is driven to advance in an appropriate manner through the entire machine. The conveyor 10 is equipped with saddles for carrying the the breast caps 1. The term "breast cap" signifies a poultry body part from which the extremities have been removed leaving part of the skeleton including the breastbone 2, the coracoids 3 each with a wing joint 4 attached at one end, the wishbone or clavicle 5 attached to the wing joints and at least part of the ribs 6. The apparatus further comprises guiding members, which are not represented in the FIGURE, for holding the breast cap 1 down on the saddle, a supporting element 11, which is controlled to move between the branches of the clavicle 5, a scraping tool 12 and a pair of lateral pressing elements 13.

The supporting element 11 comprises a wedge-shaped block 14 with its tapered end 15 directed counter to the advancing direction of the conveyor 10, and is mounted on a non-shown axis attached to the frame above the path of the conveyor 10 to pivot in the conveying plane corresponding to the plane of symmetry of the breast cap 1. The control of the pivotal movement is achieved with a cam mechanism, which is not shown, in coordination with the advancing movement of the breast cap 1 or the conveyor 10 and the corresponding position of the saddle carrying the breast cap 1. The flanks 16 of the block 14 are convexly formed to adapt to the branched form of the clavicle 5. The flanks 16 are furthermore provided with groove-like recesses 17, which have both a path and a cross-sectional form adapted to allow the branches 7 of the clavicle to slide therein when the block 14 is swung into position between them and lie flush with the flank outer surface when the tapered end 15 of the block 14 rests against the inner side of the clavicle 5.

The scraping tool 12 is fixedly arranged on the frame in a position adjacent the block 14 when the latter is swung into the conveyor path. It comprises a pair of scraping knives 18, which are symmetrically arranged on either side of the advanced saddles. The blades 19 are directed against the direction of movement of the conveyor 10 and extend essentially vertically and parallel to the flanks 16 of the block 14. The movement of the scraping knives 18 is coordinated with the controlled pivotal movement of the block 14, and controlled by means of a non-shown cam mechanism in such a way that the blades 14 follow the shape of the flanks 16 of the block 14 while the latter is drawn along with the movement of the advancing breast cap and thereby undergoes a swinging movement. When the blades 19 arrive at the tapered end 15 of the block 14 the scraping blades are swung out of the path of the advancing breast caps 1.

The pressing elements 13 are each formed as pivot levers, which are held with their free ends extending into the path of the advancing breast cap 1 under spring force. The free end of each pressing element is fork-shaped and forms a convexly curved pressing surface 20, which essentially comes into contact with the breast cap 1 at the height of the clavicle 5 directly before the point of operation of the blades 19 of the scraping knives 18. In the interests of clarity, the pressing element 13 is represented in its entirety when half swung out of the path of the advancing breast caps and partially represented in its base position. The operation of the apparatus is described in the following: After placing the preferably,skinned breast cap 1 on the saddle, the breast cap is advanced with the breast bone 2 pointing upwards and the wing joints 4 leading into the region of the above described apparatus for processing the clavicle 5. The block 14 is then controllably steered against the advancing breast cap 1 between the branches 7 of the clavicle, such that the relative movement between the breast cap 1 and the block 14 is maintained until the tapered end 15 of the block 14 has reached the head of the clavicle 8. At this point the branches 7 of the clavicles have slip into the recesses 17 in the flanks 16 of the block so that the outer contour of the clavicle branches 7 lie flush with the block flanks 16. This process is aided by the pressing elements 13, which by this time are positioned on either side of the breast cap 1. During this operation, these pressing elements 13 stroke (press against) those, meat parts lying on the sides of the clavicle 5 and the colloids 3 as the breast cap 1 passes between them and so assist in pushing the clavicle branches 7 into the recesses 17 in the block 14. This operation occurs in such a way, that even when the clavicle 5 is broken or over-stretched, the broken or overspread clavicle branches 7 can be successfully inserted into the recesses 17 so that they sit flush with the block flanks 16. At this point, the block 14 is subjected to a component of movement which results in its synchronous advancement with the breast cap 1, so that the block 14 and the breast cap 1 are stationary relative to one another.

By this time, the scraping knives 18 of the scraping tool 12 have been controllably steered into the path of the advancing breast cap 1, while the scraping knives 18 have been steered apart to to leave a mutual spacing so that the wing joints 4 on the leading ends of the colloids 3 can enter between the knives 18. At the moment at which this occurs, the scraping knives are steered towards one another until they are positioned with their blades 19 in the plane of the block flanks 16. A relative movement between the block 14 and the scraping knives 18 then starts, during which the scraping knives 18 follow the flanks 16 of the block 14 and separate the meat from the clavicle branches 7 lying in the recesses 17. Throughout this operation, the pressing elements 13, which act directly upstream of the scraping knives 18, constantly press the clavicle branches 7 against the block 14. Shortly after the scraping knives 18 have reached the tapered end 15 of the block 14, they are controllably steered upwards out of the path of the breast cap and returned to their base position, so that a new cycle can begin. A conventional filletting process can follow this operation, so that a so-called "butterfly fillet", which is free of bone remains to the highest extent can be obtained as the end product.

We claim:

1. An apparatus for processing at least part of a slaughtered poultry body defining a plane of symmetry, said part comprising at least a breast portion having a clavicle (wishbone, lat. clavicula) with left and right branches, said apparatus comprising
    a) means for holding said poultry part aligned with respect to its plane of symmetry with said left and right clavicle branches extending out of said plane,
    b) means for advancing said poultry part in a predetermined direction with said clavicle leading,
    c) a supporting element defining lateral flanks for entering between the branches of the clavicle, each flank having a recess for receiving a branch of said clavicle,
    d) scraping means for removing meat from said clavicle, said scraping means being adapted for controlled movement along said supporting element flanks, and
    e) pressing means associated with said scraping means, said pressing means having fork-shaped free ends and being arranged with respect to said advancing direction to operate directly upstream of said scraping means and further being adapted to act on said poultry body at approximately a height of said clavicle to urge said clavicle branches into said recesses to cause said branches to lie flush with said flanks.

2. An apparatus as claimed in claim 1, wherein said pressing means comprises at least one pivot lever arranged on either side of said plane of symmetry, each pivot lever having said fork-shaped free ends which is pivotable into the path of the advancing poultry part and which comprises a pressing surface for contacting said poultry part essentially at the height of said clavicle.

3. An apparatus as claimed in claim 2, wherein said free end of each pivot lever is forked.

4. An apparatus as claimed in claim 2, wherein each flank of said supporting element comprises a recess for receiving a branch of said clavicle such that said branch lies flush with the said flank surface.

5. An apparatus as claimed in claim 3, wherein each flank of said supporting element comprises a recess for receiving a branch of said clavicle such that said branch lies flush with the said flank surface.

6. An apparatus as claimed in claim 1, wherein said means for holding said poultry body is connected to an endless driven conveyor.

7. An apparatus according to claim 1, further comprising said pressing means being opposed pivot levers with said fork-shaped free ends forming a convexly curved pressing surface that contacts said poultry body.

* * * * *